United States Patent
Okhravi et al.

(10) Patent No.: US 10,268,601 B2
(45) Date of Patent: Apr. 23, 2019

(54) TIMELY RANDOMIZED MEMORY PROTECTION

(71) Applicant: Massachusetts Institute of Technology, Cambridge, MA (US)

(72) Inventors: Hamed Okhravi, Billerica, MA (US); Thomas R. Hobson, Belmont, MA (US); David O. Bigelow, Maynard, MA (US); Robert Rudd, Cambridge, MA (US); David M. Perry, Eddyville, KY (US); Kristin S. Dahl, Cambridge, MA (US); William W. Streilein, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 20 days.

(21) Appl. No.: 15/185,370

(22) Filed: Jun. 17, 2016

(65) Prior Publication Data
US 2017/0364452 A1    Dec. 21, 2017

(51) Int. Cl.
| | |
|---|---|
| G06F 11/00 | (2006.01) |
| G06F 12/14 | (2006.01) |
| G06F 11/10 | (2006.01) |
| G06F 21/52 | (2013.01) |
| H04L 9/08 | (2006.01) |

(52) U.S. Cl.
CPC ...... *G06F 12/1466* (2013.01); *G06F 11/1004* (2013.01); *G06F 21/52* (2013.01); *H04L 9/0894* (2013.01); *G06F 2212/1052* (2013.01); *G06F 2212/402* (2013.01); *G06F 2221/033* (2013.01)

(58) Field of Classification Search
CPC .. G06F 11/1004; G06F 12/1466; G06F 21/52; G06F 2221/033; G06F 2212/402; G06F 2212/1052; H04L 9/0894
USPC ......................................................... 714/54
See application file for complete search history.

(56) References Cited

U.S. PATENT DOCUMENTS

| | | |
|---|---|---|
| 5,850,525 A | 12/1998 | Kalkunte et al. |
| 6,381,669 B1 | 4/2002 | Chudnovsky et al. |
| 7,546,430 B1 * | 6/2009 | Miller ................. G06F 12/1408 711/163 |
| 7,971,255 B1 | 6/2011 | Kc et al. |
| 8,646,050 B2 | 2/2014 | Vidrine et al. |
| 9,104,869 B2 | 8/2015 | Tobin |
| 9,213,531 B2 | 12/2015 | Tallam et al. |
| 9,256,552 B2 | 2/2016 | Epstein |
| 9,754,112 B1 | 9/2017 | Moritz et al. |
| 2002/0152061 A1 | 10/2002 | Shimogori et al. |
| 2003/0182491 A1 | 9/2003 | Chudnovsky et al. |
| 2003/0231630 A1 | 12/2003 | Messenger |
| 2006/0052962 A1 | 3/2006 | Shipton et al. |

(Continued)

OTHER PUBLICATIONS

Wikipedia definitions for DLL injection, retrieved from https://en.wikipedia.org/wiki/DLL_injection (Year: 2018).*

(Continued)

*Primary Examiner* — Yair Leibovich
(74) *Attorney, Agent, or Firm* — Daly, Crowley, Mofford & Durkee, LLP

(57) ABSTRACT

In a system executing a program, a method comprises detecting one or more input/output calls associated with the program and re-randomizing memory associated with the program in response to the one or more input/output calls. A related system is also described.

14 Claims, 9 Drawing Sheets

(56) References Cited

U.S. PATENT DOCUMENTS

| | | | |
|---|---|---|---|
| 2007/0234296 | A1 | 10/2007 | Zorn et al. |
| 2008/0016314 | A1* | 1/2008 | Li ........................ G06F 21/554 |
| | | | 711/200 |
| 2008/0060077 | A1 | 3/2008 | Cowan et al. |
| 2009/0060176 | A1 | 3/2009 | Yokota et al. |
| 2009/0183261 | A1 | 7/2009 | Peinado et al. |
| 2011/0145472 | A1 | 6/2011 | Whitehouse et al. |
| 2011/0191848 | A1 | 8/2011 | Zorn et al. |
| 2011/0293045 | A1 | 12/2011 | Gross et al. |
| 2012/0047259 | A1 | 2/2012 | Krasser et al. |
| 2012/0297485 | A1* | 11/2012 | Maeda ..................... G06F 21/52 |
| | | | 726/23 |
| 2013/0024930 | A1* | 1/2013 | Steil ..................... G06F 21/575 |
| | | | 726/16 |
| 2013/0086299 | A1 | 4/2013 | Epstein |
| 2013/0111587 | A1 | 5/2013 | Goel et al. |
| 2013/0276056 | A1 | 10/2013 | Epstein |
| 2014/0020112 | A1 | 1/2014 | Goodes |
| 2014/0229717 | A1* | 8/2014 | Venkat ..................... G06F 21/79 |
| | | | 712/225 |
| 2014/0282431 | A1 | 9/2014 | Delio, Jr. |
| 2014/0359773 | A1 | 12/2014 | Matthews et al. |
| 2015/0047049 | A1 | 2/2015 | Panchenko et al. |
| 2015/0106872 | A1 | 4/2015 | Hiser et al. |
| 2015/0294114 | A1 | 10/2015 | Monahan et al. |
| 2016/0034687 | A1 | 2/2016 | Rhee et al. |
| 2016/0092674 | A1 | 3/2016 | Hughes et al. |
| 2016/0092675 | A1 | 3/2016 | Vidrine et al. |
| 2016/0140031 | A1 | 5/2016 | Sun et al. |
| 2017/0123859 | A1 | 5/2017 | Khojastepour et al. |
| 2017/0124322 | A1 | 5/2017 | Guilley et al. |
| 2017/0286674 | A1 | 10/2017 | Gathala et al. |
| 2017/0357808 | A1* | 12/2017 | Arroyo ..................... G06F 21/57 |
| 2018/0173433 | A1 | 6/2018 | Miller et al. |

OTHER PUBLICATIONS

Wikipedia definitions for hooking, retrieved from https://en.wikipedia.org/wiki/Hooking#API/Function_Hooking/Interception_Using_JMP_Instruction_aka_Splicing (Year: 2018).*

Bigelow et al., "Timely Rerandomization for Mitigating Memory Disclosures;" Proceedings of the $22^{nd}$ ACM Conference on Computer and Communications Security (CCS '15); Oct. 12-16, 2015; 12 Pages.

PCT International Search Report and Written Opinion dated Oct. 16, 2017 for International Application No. PCT/US17/34970; 12 pages.

Lu et al., "How to Make ASLR Win the Clone Wars: Runtime Re-Randomization;" Georgia Institute of Technology; Feb. 21-24, 2016; 15 pages.

North, "Identifying Memory Address Disclosures;" De Montfort University; Jan. 2015; 150 pages.

Abadi et al., "Control-Flow Integrity;" Proceedings of the $12^{th}$ ACM Conference on Computer and Communications Security; Nov. 2005; 14 Pages.

Akritidis, "Cling: A Memory Allocator to Mitigate Dangling Pointers;" Proceedings of the USENIX Security Symposium; Aug. 2010; 16 Pages.

Anderson, "Computer Security Technology Planning Study;" ESD-TR-73-51, vol. II; Technical Report, DTIC Document; Oct. 1972; 142 Pages.

Backes et al., "Oxymoron: Making Fine-Grained Memory Randomization Practical by Allowing Code Sharing;" Proceedings of the $23^{rd}$ USENIX Security Symposium; Aug. 20-22, 2014; 16 Pages.

Backes et al., "You Can Run but You Can't Read: Preventing Disclosure Exploits in Executable Code;" Proceedings of the $21^{st}$ ACM Conference on Computer and Communications Security (CCS '14); Nov. 3-7, 2014; 12 Pages.

Barrantes et al., "Randomized Instruction Set Emulation to Disrupt Binary Code Inject Attacks;" Proceedings of the $10^{th}$ ACM Conference on Computer and Communications Security (CCS '03); Oct. 27-30, 2003; 10 Pages.

Bittau et al., "Hacking Blind;" Proceedings of the $35^{th}$ IEEE Symposium on Security and Privacy; May 2014; 16 Pages.

Caselden et al., "Operation Greedywonk: Multiple Economic and Foreign Policy Sites Compromised, Serving Up Flash Zero-Day Exploit;" FireEye Threat Research Blog posted on Feb. 20, 2014; 8 Pages.

Chen et al., "MemBrush: A Practical Tool to Detect Custom Memory Allocators in C Binaries;" Proceedings of the $20^{th}$ Working Conference on Reverse Engineering (WCRE '13); Oct. 14-17, 2013; 2 Pages.

Chen, "ASLR Bypass Apocalypse in Recent Zero-Day Exploits;" FireEye Threat Research Bog posted on Oct. 15, 2013; 8 Pages.

Chen et al., "New Zero-Day Exploit Targeting Internet Explorer Versions 9 Through 11 Identified in Targeted Attacks;" FireEye Threat Research Blog posted on Apr. 26, 2014; 4 Pages.

Common Vulnerabilities and Exposures (CVE), "CVE-2013-2028;" Webpage Retrieved from <https://cve.mitre.org/cgi-bin/cvename.cgi?name=CVE-2013-2028>; Jan. 2013; 2 Pages.

Corelan Team, "Exploit Writing Tutorial Part 6: Bypassing Stack Cookies, SafeSeh, SEHOP, HW DEP and ASLR;" Published on Sep. 21, 2009; Retrieved from <https://www.corelan.be>; 69 Pages.

Cowan et al., "Protecting Systems from Stack Smashing Attacks with StackGuard;" Linux Expo, Citeseer; Jan. 1999; 11 Pages.

Crane et al., "Readactor: Practical Code Randomization Resilient to Memory Disclosure;" Proceedings of the $36^{th}$ IEEE Symposium on Security and Privacy; May 18-20, 2015; 18 Pages.

Curtsinger et al., "Stabilizer: Statistically Sound Performance Evaluation;" Proceedings of the $18^{th}$ International Conference on Architectural Support for Programming Languages and Operating Systems (ASPLOS '13); Mar. 16-20, 2013; 10 Pages.

Davi et al., "Isomeron: Code Randomization Resilient to (Just-In-Time) Return-Oriented Programming;" Proceedings of the Network and Distributed System Security Symposium (NDSS '15); Feb. 8-11, 2015; 15 Pages.

Durden, "Bypassing PaX ASLR Protection;" Phrack Magazine, vol. 59; Released Jul. 28, 2002; 18 Pages.

Eager, "Introduction to the DWARF Debugging Format;" Retrieved from <http://www.dwarfstd.org>; Feb. 2007; 10 Pages.

Evans et al., "Missing the Point(er): On the Effectiveness of Code Pointer Integrity;" Proceedings of the IEEE Symposium on Security and Privacy; May 17-21, 2015; 16 Pages.

FireEye, "Zero-Day Danger: A Survey of Zero-Day Attacks and What They Say About the Traditional Security Model;" White Paper; Jan. 2014; 16 Pages.

Giuffrida et al., "Enhanced Operating System Security Through Efficient and Fine-Grained Address Space Randomization;" Proceedings of the $21^{st}$ USENIX Security Symposium; Aug. 8-10, 2012; 16 Pages.

Göktas et al., "Out of Control: Overcoming Control-Flow Integrity;" Proceedings of the IEEE Symposium on Security and Privacy; May 18-21, 2014; 15 Pages.

Heartbleed.com, "The Heartbleed Bug;" Retrieved from <http://www.heartbleed.com/>; Webpage Updated Apr. 29, 2014; 7 Pages.

Hiser et al., "ILR: Where'd My Gadgets Go?;" Proceedings of the IEEE Symposium on Security and Privacy; May 20-23, 2012; 15 Pages.

Hobson et al., "On the Challenges of Effective Movement;" Proceedings of the $1^{st}$ ACM Workshop on Moving Target Defense (MTD '14); Nov. 3, 2014; 10 Pages.

ISO, ISO/IEC 9899:2011, "Information Technology—Programming Languages—C;" American National Standard; Date of Approval: May 23, 2012; 702 Pages.

Jackson et al., "Compiler-Generated Software Diversity;" Chapter 4 from the book *Moving Target Defense: Creating Asymmetric Uncertainty for Cyber Threats*; Published in 2011; pp. 77-98; 22 Pages.

Jim et al., "Cyclone: A Safe Dialect of C;" Proceedings of the USENIX Annual Technical Conference, General Track; Dec. 2001; pp. 275-288; 14 Pages.

Kc et al., "Countering Code-Injection Attacks with Instruction-Set Randomization;" Proceedings of the $10^{th}$ ACM Conference on Computer and Communications Security (CCS '03); Oct. 27-30, 2003; 10 Pages.

(56) References Cited

OTHER PUBLICATIONS

Keromytis et al., "The Minestrone Architecture Combining Static and Dynamic Analysis Techniques for Software Security;" Proceedings of the IEEE First SysSec Workshop; Jul. 6, 2011; pp. 53-56; 4 Pages.
Kil et al., "Address Space Layout Permutation (ASLP): Towards Fine-Grained Randomization of Commodity Software;" Proceedings of the IEEE $22^{nd}$ Annual Computer Security Applications Conference (ACSAC '06); Dec. 2006; 10 Pages.
Kuznetsov et al., "Code-Pointer Integrity;" Proceedings of the $11^{th}$ USENIX Symposium on Operating Systems Design and Implementation; Oct. 6-8, 2014; 18 Pages.
Kwiatkowska et al., "PRISM 4.0: Verification of Probabilistic Real-time Systems;" Proceedings of the $23^{rd}$ International Conference on Computer Aided Verification (CAV '11), vol. 6806 of LNCS; Dec. 4, 2011; pp. 585-591; 7 Pages.
Luk et al., "Pin: Building Customized Program Analysis Tools with Dynamic Instrumentation;" Proceedings of the ACM SIGPLAN 2005 Conference on Programming Language Design and Implementation (PLDI '05); Jan. 2005; 11 Pages.
Mashtizadeh et al., "CCFI: Cryptographically Enforced Control Flow Integrity;" Proceedings of the 22nd ACM SIGSAC Conference on Computer and Communications Security (CCS '15); Oct. 12-16, 2015; pp. 941-951; 11 Pages.
Mohan et al., "Opaque Control-Flow Integrity;" Proceedings of the Network and Distributed System Security Symposium (NDSS '15); Feb. 8-11, 2015; 15 Pages.
Mosberger-Tang, "Libunwind(3): libunwind—a (mostly) platform-independent unwind API;" *The Libunwind Project*; Retrieved from <http://www.nongnu.org/libunwind/man/libunwind(3).html>; Jan. 2014; 4 Pages.
MSDN: ReBaseImage Function; Retrieved from < https://msdn.microsoft.com/en-us/library/windows/desktop/aa363364%28v=vs.85%29.aspx>; 2015; 3 Pages.
Nagarakatte et al., "CETS: Compiler-Enforced Temporal Safety for C;" Proceedings of the ACM SIGPLAN Conference on International Symposium on Memory Management; (ISMM '10), vol. 45; Jun. 5-6, 2010; 10 Pages.
Nagarakatte et al., "SoftBound: Highly Compatible and Complete Spatial Memory Safety for C;" Proceedings of the ACM SIGPLAN Conference on Programming Language Design and Implementation (PLDI '09); Jun. 15-20, 2009; 14 Pages.
Necula et al., "CCured: Type-Safe Retrofitting of Legacy Code;" Proceedings of the ACM SIGPLAN Conference on Principles of Programming Languages (POPL '02), vol. 37; Jan. 16-18, 2002; pp. 128-139; 12 Pages.
Nergal, "The Advanced Return-into-lib(c) exploits: PaX Case Study;" Phrack Magazine, vol. 58, No. 4; Dec. 2001; 34 Pages.
Nethercote et al., "Valgrind: A Framework for Heavyweight Dynamic Binary Instrumentation;" Proceedings of the ACM SIGPLAN 2007 Conference on Programming Language Design and Implementation (PLDI '07); Jun. 11-13, 2007; 12 Pages.
Netmarketshare: Desktop Top Operating System Share Trend; Retrieved from <http://www.netmarketshare.com/operating-system-market-share.aspx?qpcustomb=0&qprid=11>; 2 Pages.
Okhravi et al., "Finding Focus in the Blur of Moving-Target Techniques;" Proceedings of the IEEE Security and Privacy, vol. 12, No. 2; Mar./Apr. 2014; 11 Pages.
One, "Smashing the Stack for Fun and Profit;" Phrack Magazine, vol. 7, Issue 49, File 14 of 16; Jan. 1999; 26 Pages.
Papadogiannakis et al., "ASIST: Architectural Support for Instruction Set Randomization;" Proceedings of the 2013 ACM SIGSAC Conference on Computer and Communications Security (CCS '13); Nov. 4-8, 2013; 12 Pages.
Pappas et al., "Smashing the Gadgets: Hindering Return-Oriented Programming Using In-Place Code Randomization;" Proceedings of the IEEE Symposium on Security and Privacy; May 20-23, 2012; pp. 601-615; 15 Pages.

Parno et al., "Bootstrapping Trust in Commodity Computers;" Proceedings of the $31^{st}$ IEEE Symposium on Security and Privacy; May 16-19, 2010; pp. 414-429; 16 Pages.
PaX: PaX Address Space Layout Randomization; Retrieved from <https://pax.grsecurity.net/docs/aslr.txt>; 2003; 4 Pages.
Rafkind et al., "Precise Garbage Collection for C;" Proceedings of the ACM SIGPLAN International Symposium on Memory Management (ISMM '09); Jun. 19-20, 2009; 10 Pages.
Robertston et al., "Run-Time Detection of Heap-Based Overflows;" Proceedings of the $17^{th}$ Large Installation Systems Administration Conference (LISA '03); Oct. 26-31, 2003; pp. 51-60; 11 Pages.
Schuster et al., "Counterfeit Object-oriented Programming: On the Difficulty of Preventing Code Reuse Attacks in C++ Applications;" Proceedings of the $36^{th}$ IEEE Symposium on Security and Privacy; May 18-20, 2015; 18 Pages.
Scott et al., "Retargetable and Reconfigurable Software Dynamic Translation;" Proceedings of the International Symposium on Code Generation and Optimization: Feedback-Directed and Runtime Optimization (CGO '03); Mar. 23-26, 2003; pp. 36-47; 12 Pages.
Seibert et al., "Information Leaks Without Memory Disclosures: Remote Side Channel Attacks on Diversified Code;" Proceedings of the $21^{st}$ ACM Conference on Computer and Communications Security (CCS '14); Nov. 3-7, 2014; 12 Pages.
Serebryany et al., "AddressSanitizer: A Fast Address Sanity Checker;" Proceedings of the USENIX Annual Technical Conference (ATC '12); Jun. 13-15, 2012; pp. 309-318; 10 Pages.
Shacham, "The Geometry of Innocent Flesh on the Bone: Return-into-libc Without Function Calls (on the x86);" Proceedings of the $14^{th}$ ACM Conference on Computer and Communications Security (CCS '07); Oct. 29, 2007; 30 Pages.
Shacham et al., "On the Effectiveness of Address-Space Randomization;" Proceedings of the ACM Conference on Computer and Communications Security (CCS '04); Oct. 25-29, 2004; 10 Pages.
Snow et al., "Just-In-Time Code Reuse: On the Effectiveness of Fine-Grained Address Space Layout Randomization;" Proceedings of the 2013 IEEE Symposium on Security and Privacy; May 19-22, 2013; pp. 574-588; 15 Pages.
Sovarel et al., "Where's the FEEB? The Effectiveness of Instruction Set Randomization;" Proceedings of the $14^{th}$ USENIX Security Symposium; Aug. 1-5, 2005; 16 Pages.
Stanford Secure Computer Systems Group, "Blind Return Oriented Programming (BROP);" Research Paper Retrieved from <http://www.scs.stanford.edu/brop/>; Jan. 2014; 2 Pages.
Strackx et al., "Breaking the Memory Secrecy Assumption;" Proceedings of the $2^{nd}$ European Workshop on System Security (EUROSEC '09); Mar. 31, 2009; 8 Pages.
Szekeres et al., "SoK: Eternal War in Memory;" Proceedings of the IEEE Symposium on Security and Privacy; May 19-22, 2013; 15 Pages.
Tice et al., "Enforcing Forward-Edge Control-Flow Integrity in GCC & LLVM;" Proceedings of the $23^{rd}$ USENIX Security Symposium; Aug. 20-22, 2014; 16 Pages.
Wartell et al., "Binary Stirring: Self-randomizing Instruction Addresses of Legacy x86 Binary Code;" Proceedings of the $19^{th}$ ACM Conference on Computer and Communications Security (CCS '12); Oct. 16-18, 2012; pp. 157-168; 12 Pages.
Williams et al., "Security through Diversity: Leveraging Virtual Machine Technology;" Proceedings of the $30^{th}$ IEEE Symposium on Security and Privacy; May 17-20, 2009; pp. 26-33; 8 Pages.
Zhang et al., "Control Flow Integrity for COTS Binaries;" Proceedings of the $22^{nd}$ USENIX Security Symposium; Aug. 14-16, 2013; pp. 337-362; 17 Pages.
Zhang et al., "Practical Control Flow Integrity & Randomization for Binary Executables;" Proceedings of the IEEE Symposium on Security and Privacy; May 19-22, 2013; pp. 559-573; 15 Pages.
Office Action dated Dec. 22, 2017 for U.S. Appl. No. 15/234,028; 20 pages.
Final Office Action for U.S. Appl. No. 15/234,028 dated May 3, 2018; 21 pages.
Response to U.S. Non-Final Office Action dated Dec. 22, 2017 for U.S. Appl. No. 15/234,028; Response filed on Mar. 19, 2018; 10 pages.

(56) References Cited

OTHER PUBLICATIONS

Non-Final Office Action dated Aug. 24, 2018 for U.S. Appl. No. 15/234,028; 19 Pages.
Response to Final Office Action dated May 3, 2018 for U.S. Appl. No. 15/234,028, filed Jul. 16, 2018; 10 pages.
Request for Continued Examination for U.S. Appl. No. 15/234,028, filed Jul. 16, 2018; 3 pages.
Notice of Allowance dated Feb. 02, 2019 for U.S. Appl. No. 15/234,028; 14 Pages.
Homescu, et al.; "Librando: Transparent Code Randomization for Just-in-Time Compilers"; Conference on Computer and Communications Security; CCS'13; Nov. 4-8, 2013; Retrieved from Internet on Feb. 7, 2019; https://www.ics.uci.edu/~ahomescu/ccs13librando_printed.pdf; 11 Pages.

\* cited by examiner

TIMELY RANDOMIZED MEMORY PROTECTION

STATEMENT REGARDING FEDERALLY SPONSORED RESEARCH

This invention was made with Government support under Contract No. FA8721-05-C-0002 awarded by the U.S. Air Force. The Government has certain rights in the invention.

BACKGROUND

Cyber attacks may rely upon techniques that can repurpose existing code in a software program (or "application") and cause that code to carry out malicious tasks. In order to accomplish this goal, an attacker may determine the location in memory of existing code that they wish to exploit, and then corrupt the program state in a way such that their desired actions are carried out instead of the program's intended actions. Operating system and application developers have responded in turn to such threats by introducing memory protection techniques. For example, Address Space Layout Randomization (ASLR) is intended to obscure the location of code in memory. As another example, Stack Cookies (or "canaries") are intended to detect program state corruption. However, existing memory protection techniques have been successfully attacked and such attacks are widely used.

SUMMARY

It is appreciated herein that attackers have been able to attack existing memory protection techniques by taking advantage of the fact that existing techniques are not dynamic and typically perform a one-time defensive action. There is a need for new memory protection techniques that eliminate the ability of the attacker to exploit such static aspects. Moreover, because some commercially available application/operating system combinations may be distributed without source code or embedded debugging information, there is a need for improved memory protection techniques that can protect ordinary program binaries as distributed by their publisher.

Described herein are memory protection techniques that can mitigate the impact of memory disclosure attacks which are often used to bypass other memory defenses for program binaries. The described techniques include dynamic runtime re-randomization of stack cookies, heap integrity data, and function lookup table addresses via controlled random keys, thus ensuring that attackers are unable to exploit any knowledge obtained through memory disclosure vulnerabilities. The re-randomization may be tied to system input/output calls to thwart possible attacks. The memory protection techniques described herein can be used with closed source, commodity binaries and do not require changes to the operating system. Moreover, the described techniques are lightweight and avoid performance-heavy binary translation or emulation techniques.

According to one aspect of the disclosure, in a system executing a program, a method comprises detecting one or more input/output calls associated with the program and re-randomizing memory associated with the program in response to the one or more input/output calls. In some embodiments, verifying state data associated with the program in response to the one or more input/output calls. In certain embodiments, detecting one or more input/output calls comprises detecting one or more output calls is followed by an input call. In one embodiment, the method further comprises intercepting the input call before re-randomizing the memory and allowing the input call to complete after re-randomizing the memory.

In various embodiments, re-randomizing the memory comprises generating random stack cookies. In some embodiments, generating the random stack cookies comprises: generating a random master cookie; storing the master cookie in the memory; obtaining a stack trace for the program, the stack trace including information about one or more stack frames; for each of the stack frames, generating a random stack cookie using the master stack cookie; and for each of the stack frames, storing the stack cookie in the memory. The method may further comprise verifying the random stack cookie for each of the stack frames using the master stack cookie. In certain embodiments, the stack trace includes a memory address for each of the stack frames, and generating a random stack cookie for each of the stack frames comprises performing a logical exclusive disjunction operation (XOR) between the master stack cookie and the corresponding memory address. In some embodiments, the program comprises a plurality of modules, and wherein generating the random master cookie comprises generating a random master cookie for each of the modules. In one embodiment, the method further comprises, for each of the modules: detecting the module being loaded; determining a memory location of a master cookie associated with the module; and in response to generating the random master cookie for the module, storing the generated master cookie at the determined memory location.

In particular embodiments, re-randomizing memory associated with the program comprises re-randomizing heap integrity data. In some embodiments, re-randomizing heap integrity data comprises: generating a random secret key; storing the random secret key in the memory; determining a memory location for one or more heap allocations stored in the memory; for each of the heap allocations, encrypting header information associated with the heap allocation using the secret key; and for each of the heap allocations, storing the encrypted header information in the memory. The method may further comprise: verifying the encrypted header information for each of the heap allocations using the secret key. In one embodiment, the method further comprises verifying a error-detecting code value for each of the heap allocations. In some embodiments, the method further comprises, for each of the heap allocations: is generating a random heap cookie; calculating an error-detecting code value using at least the random heap cookie; and storing the error-detecting code value in the memory.

In certain embodiments, re-randomizing memory associated with the program comprises re-randomizing an encrypted function lookup table (FLT). The method may further comprise generating the encrypted FLT based on an existing FLT associated with the program, the encrypted FLT having a plurality of code snippets, and rewriting program code to replace indirect calls to the existing FLT with direct calls to the code snippets. In one embodiment, each of the code snippets includes instructions to decrypt an encrypted address associated with the code snippet using a secret key and to call a function at the decrypted address associated with the code snippet, and re-randomizing the encrypted FLT comprises: generating a new secret key; storing the new secret key in memory; and updating each of the code snippets to use the new secret key. In some embodiments, re-randomizing the encrypted FLT comprises changing a memory location of one or more of the code snippets with the encrypted FLT, and rewriting the program code to call the one or more code snippets at the corresponding changed memory location.

According to another aspect of the disclosure, a system for executing a program comprises one or more processors, a volatile memory, and a non-volatile memory storing computer program code. When executed, the computer program code may causes execution across the one or more processors of a process operable to perform the operations of: detecting one or more input/output calls associated with the program; and re-randomizing memory associated with the program in response to the one or more input/output calls

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. As used herein, the terms "computer memory" and "memory" refer to primary storage within a computer. In some embodiments, computer memory may be provided as random access memory (RAM) and/or disk-backed virtual memory.

The terms "computer program," "program," and "application" are used herein to refer a collection of machine code instructions and data that can be executed by a computer. A program may be stored in an executable image (e.g., a compiled binary). These terms are also used herein to refer to an executable image being executed by a computer (i.e., a process).

The terms "memory address," "address," and "memory location" refer to a location within computer memory at which a program or operating system can store and fetch data and instructions. As used herein, the term "program address space" refers to a set of memory addresses that may be accessed by a program. In some contexts, memory addresses/locations may be specified as relative values (e.g., as offsets from the base address of the program address space).

As used herein, the terms "input function call" and "input call" refer to any system call or other function call by which a user or attacker can potentially affect the internal logic of a program. The terms "output function call" and "output call" refer to any system call or other function call by which a user/attacker can potentially disclose the contents of memory. The term "input/output call" (or "I/O call") is used herein to refer to a call that is either an input call or an output call.

As used herein, the term "shared library" refers to a collection of computer data and/or instructions that may be shared between multiple processes/programs. In some embodiments, shared libraries may be dynamically linked into a program's address space. In certain embodiments, shared libraries may correspond to dynamic-link libraries (DLLs).

In particular embodiments, the systems and techniques described herein may be provided as implementations compatible with MICROSOFT WINDOWS ("WINDOWS") operating systems using an x86 architecture, but are not limited to such systems and may be implemented on other operating systems and instruction set architectures.

Figure 1:
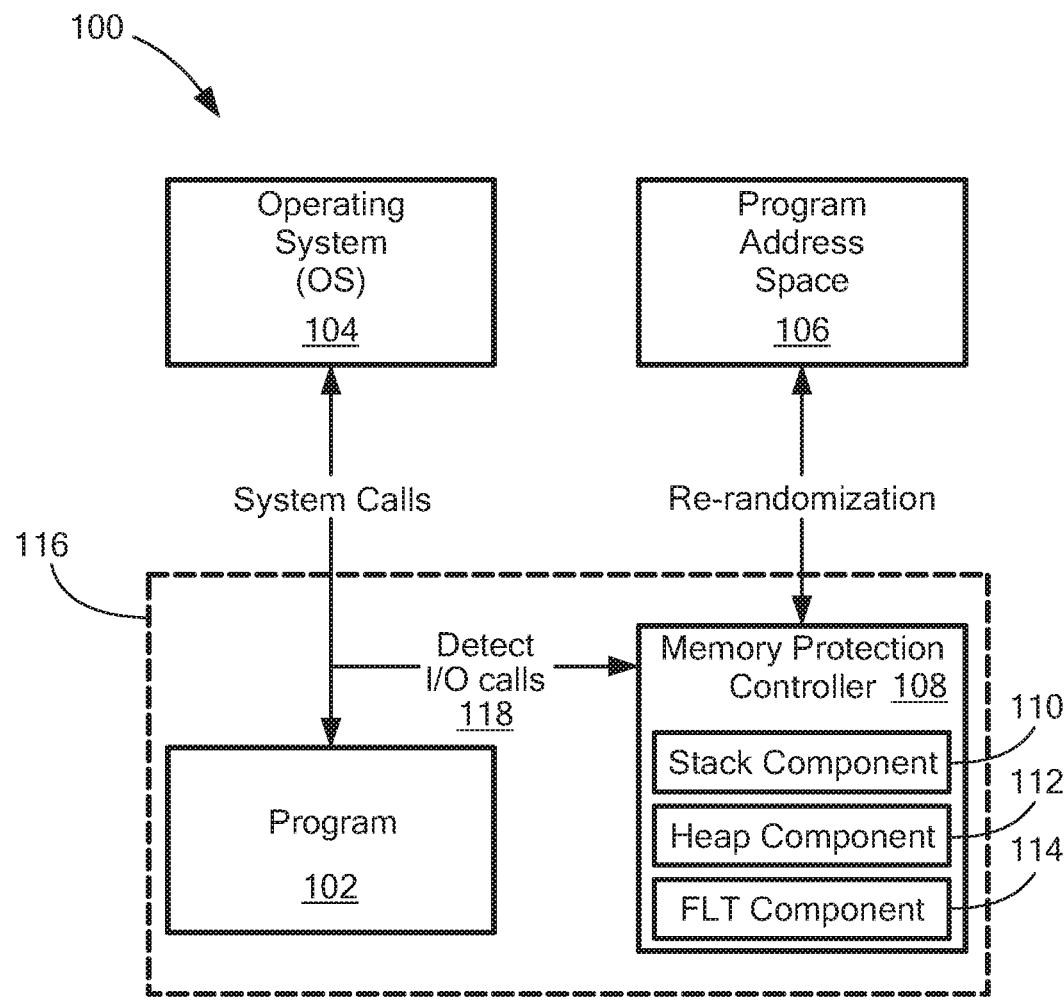
FIG. 1 is a block diagram of an illustrative system to provide timely randomized memory protection for a computer program, in accordance with an embodiment.

FIG. 1 shows a computer system 100 that can provide timely randomized memory protection, according to an embodiment. A program 102, which may be provided as a pre-compiled binary, may utilize computer memory to store data. The memory may be provided as physical memory (e.g., dynamic random-access memory or "DRAM") is and/or virtual memory.

An operating system (OS) 104 may include a memory management functionality to allocate and manage a program address space 106 for the program 102. The OS 104 may designate different regions (or "sections") of the program address space 106 for different purposes. For example, in some embodiments, the OS 104 may allocate one or more code sections and one or more data sections, where data sections may include heap data and/or stack data. In some embodiments, the OS 104 may restrict the program's memory access to the program address space 106.

In some embodiments, the program 102 may access external functions, data, and other resources provided by shared libraries. When the program 102 is loaded into memory, the external memory locations of these resources may be mapped into the program's address space 106 using a data structure referred to herein as a "function lookup table" (FLT). This mapping process is sometimes referred to as "dynamic linking." At the machine code level, an imported function may be executed via an indirect call instruction using a relative address to a function entry within the FLT. In certain embodiments, the OS 104 is provided as a WINDOWS™ operating system and a function lookup table may correspond to an Import Address Table (IAT). In other embodiments, the OS 104 may be provided as a Unix-like operating system (e.g., Linux or MAC OS X™) and an FLT may correspond to a Global Offset Tables (GOT).

It is appreciated that FLTs may be vulnerable to various types of attacks. For example, an FLT may be vulnerable to attacks whereby an attacker can modify a function entry within the FLT to point to another, possibly malicious, function. Such attacks are referred to herein as "hooking attacks." Further, memory disclosure techniques can be used to leak the contents of an FLT, giving an attacker the memory locations of the shared libraries. Because a single instance of a shared library may be shared among multiple programs, an attacker could use FLT information leaked from one program in an exploit targeting a different program.

The computer system 100 (and, in particular, the OS 104) may implement various memory protection techniques to prevent an attacker from corrupting the address space 106 used by program 102. In some embodiments, the OS 104 may include guard-based memory defenses such as stack cookies (sometimes referred to as "stack is canaries") and heap integrity checks. In certain embodiments, the OS 104 may include diversity-based memory protection techniques such as Address Space Layout Randomization (ASLR). In particular embodiments, ASLR provided by the OS 104 may randomize the location (e.g., the base address) of program memory regions during program startup.

In some embodiments, the OS 104 may be provided as a commercial or open-source off-the-shelf OS that provides implementations of stack cookies, heap integrity checks, and/or ASLR. For example, in some embodiments the OS 104 is provided as a WINDOWS operating system that provides one or more of these memory protection features. In other embodiments, the OS 104 may be provided as a Unix-like operating system that provides one or more of these memory protection features.

A brief overview of stack cookies, heap integrity checks, and ASLR is given next.

Stack cookies (referred to as "security cookies" on some WINDOWS operating systems) are secret values that reside on stack of a program and are intended to serve as guard values against accidental overflows or intentional corruptions of key data values or regions in memory. Code may be written into the program to set randomized cookies values on the stack and re-check those values at certain points in order to ensure that corruption has not happened. For example, in some embodiments a stack cookie may be added to each stack frame adjacent to the function return address; prior to returning from a function, the value of the stack cookie is checked and if it does not match the expected value, it is indicative of a buffer overflow. It is appreciated that memory disclosures may allow an attacker to determine the randomized value of a stack cookie and use this information to subsequently ensure that the stack cookie is unchanged, or updated as necessary, as part of an attack.

Heap integrity checks protect the integrity of heap data and metadata allocated for the program 102 by the OS 104. In some embodiments, the heap itself may be divided into pages, and each page may be further divided into memory blocks. Each memory block may include a header comprising metadata used for internal management. In some embodiments, each header may include a random value referred to as a "heap entry header cookie" (HEK) or "heap cookie." In some embodiments, heap allocation is headers include an error-detecting code that is calculated using the corresponding heap cookie. In certain embodiments, the error-detecting code is a cyclic redundancy check (CRC) code. In some embodiments, when the program 102 is loaded into memory, the OS 104 may generate a secret key for each heap required by the program 102. The heap allocation header may be encrypted using the secret key (e.g., by XOR'ing the header with the secret key). The heap cookie, error-detecting code, and secret key are collectively referred to herein as "heap integrity data." In some embodiments, heap integrity data may include one or more of these values, but not all values. When allocated heap memory is operated on, an integrity check may be performed using the heap integrity data.

In general, it may be impractical (or even impossible) to prevent memory disclosures and in arbitrary programs provided as commodity binary executables. As a result, it can be assumed that an attacker is able to determine the location and contents of program memory regions, even if the region locations are randomized using ASLR. In can further be assumed that an attacker can access and manipulate stack cookies, heap integrity data, and other in-memory values used for memory protection.

In the embodiment shown, the computer system 100 includes a memory protection controller 108 to mitigate the impact of memory disclosures in stack, heap, FLTs, and/or other vulnerable program areas. As will be described in more detail below, the memory protection controller (or "the controller") 108 may introduce (or re-using existing) random key values in each of the vulnerable program areas in order to enable correct functionality, and then re-randomizing those key values such that any key value disclosed to the attacker is no longer valid by the time that the attacker has the opportunity to exploit it.

In some embodiments, the controller 108 may detect and/or intercept I/O calls made by the program 102 and perform re-randomization in response thereto. It is appreciated herein that output calls are generally the only means by which an attacker can disclose vital memory, and that input calls are generally the only time at which they can influence the internal logical of the program. Accordingly, in some embodiments, the controller 108 keys re-randomization off one or more output calls followed by an input is call. This sequence is referred to herein as an "output-input call pair" (or simply an "output-input call pair"). At each appropriate output-input pairing, one or more areas of program memory 106 may be re-randomized as described further below.

In the embodiment shown, the memory protection controller 108 includes three sub-components: a stack component 110, a heap component 112, and an FLT component 114. Each sub-component 110-114 may be operable to perform re-randomization for a corresponding vulnerable program area (e.g., the stack, heap, and FLT respectively). In some embodiments, each sub-component 110-114 may be enabled or disabled independently.

The stack component 110 may be configured to re-randomize stack cookies at every re-randomization point, thus ensuring that even when an attacker successfully obtains a stack cookie value, it is rendered invalid before it can be used. Likewise, the heap component 112 may be configured re-randomize heap integrity data at every re-randomization point.

The FLT component 112 may be configured to replace a conventional FLT that stores plaintext function addresses with a key-protected lookup table that stores encrypted function addresses. In addition, the FLT component 112 may be configured to rewrite code for program 102 in memory so that all program references to the original FLT are routed through the encrypted FLT and include a decryption step before using each function address. In some embodiments, the FLT component 112 may be configured to re-randomize the encrypted FLT at every re-randomization point. As a result, even if an attacker leaks the entire contents of an FLT, they will be unable to corrupt control flow because entries in the encrypted FLT are re-randomized before the attacker is able to use them.

In various embodiments, the controller 108 may be realized as a software wrapper 116 that mediates attempts by program 102 to access external resources. In some embodiments, the software wrapper 116 may be an independent program that either contains program 102 within itself, or explicitly calls program 102 after performing certain preliminary actions. In certain embodiments, preliminary actions may include establishing an interface library through which one or more of the memory protection techniques described herein are invoked. The software wrapper 116 may be configured is to detect and/or intercept I/O calls 118 made by the program 102. In some embodiments, the software wrapper 116 intercepts certain I/O calls 118 from the program 102 by a method commonly referred to as "hooking." In certain embodiments, the controller 108 may maintain state information for tracking I/O calls and, when the ordering of I/O calls indicates that it is time for a re-randomization, the wrapper 116 may invoke one or more of the sub-components 108-112 to perform re-randomization.

In certain embodiments, the OS 104 may be provided as a WINDOWS operating system and the software wrapper 116 may hook into one or more of the following input calls: RegQueryValueExA, RegQueryValueExW, NtQueryValueKey, NtReadFile, and ReadFile. The software wrapper 116 may also hook into one or more of the following WINDOWS output calls: CreateDirectoryW, CreateDirectoryExW, URLDownloadToFileW, URLDownloadToFileA, NtWriteFile, RegSetValueExA, RegSetValueExW, CopyFileA, CopyFileW, CopyFileExW, and WriteFile. In particular embodiments, the software wrapper 116 uses the Detours library to hook into I/O calls.

In certain embodiments, the software wrapper 116 is configured to detect program startup (e.g., using a hooking call). In response, the controller 108 and/or sub-components 110-114 may perform any necessary initialization and setup. In certain embodiments, the OS 104 may be provided as a WINDOWS operating system and the software wrapper 116 may hook into the program's module load entry point to detect startup. In certain embodiments, software wrapper 116 uses the Detours library to hook into the program's module load entry point.

Figure 2:
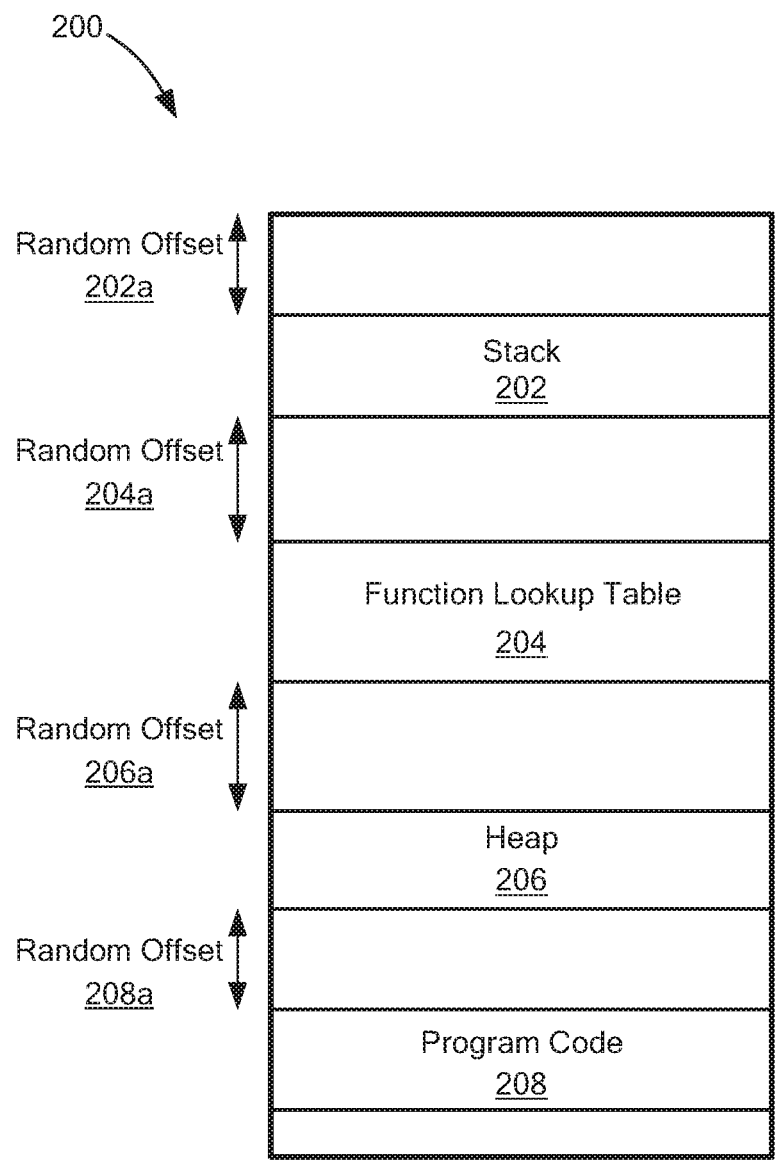
FIG. 2 is a diagram of an illustrative computer program address space, according to an embodiment.

FIG. 2 shows an example of a program address space 200, according to one embodiment. The address space 200 may be the same as or similar to program address space 106 shown in FIG. 1. The illustrative address space 200 includes a stack region 202, a function lookup table (FLT) 204, a heap region 206, and a program code region 208. In some embodiments, a program address space 200 may include multiple heap regions 206 and/or code regions 208.

In some embodiments, Address Space Layout Randomization (ASLR) may be used to obscure the location of memory regions 202-208. In particular, the base address of a memory region 202-208 may be randomized. For example, as illustrated in FIG. 1, the stack region 202 may be located at a first random offset 202a, the FLT 204 may be located at a second random offset, the heap region 206 may be located at a third random offset 206a, and the code region 208 may be located at a fourth random offset 208a.

In certain embodiments, ASLR may be performed once during the program lifetime, for example at program startup. In some embodiments, it may not be feasible to relocate memory regions 202 after startup without disrupting program execution (e.g., due to fixed pointers and addresses that would be rendered invalid if memory regions 202-208 were relocated by the OS). Accordingly, in some embodiments, the contents of certain memory regions 202-208 may be re-randomized throughout the program's lifetime, but not the location of those regions.

FIGS. 3, 4B, 5B, and 6C are flow diagrams showing illustrative processing that can be implemented within a computer system, such as the computer system 100 of FIG. 1. In some embodiments, the illustrated processing may be implemented within a memory protection controller 108 (FIG. 1) and/or within one or more of its sub-components 110-114. Within the flow diagrams, rectangular elements (typified by element 302 in FIG. 3), herein denoted "processing blocks," represent computer software instructions or groups of instructions. Diamond shaped elements (typified by element 306 in FIG. 3), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied is without departing from the spirit of the concepts, structures, and techniques sought to be protected herein. Thus, unless otherwise stated the blocks described below are unordered meaning that, when possible, the functions represented by the blocks can be performed in any convenient or desirable order. In some embodiments, the processing and decision blocks represent states and transitions, respectively, within a finite-state machine, which can be implemented in software and/or hardware.

Figure 3:
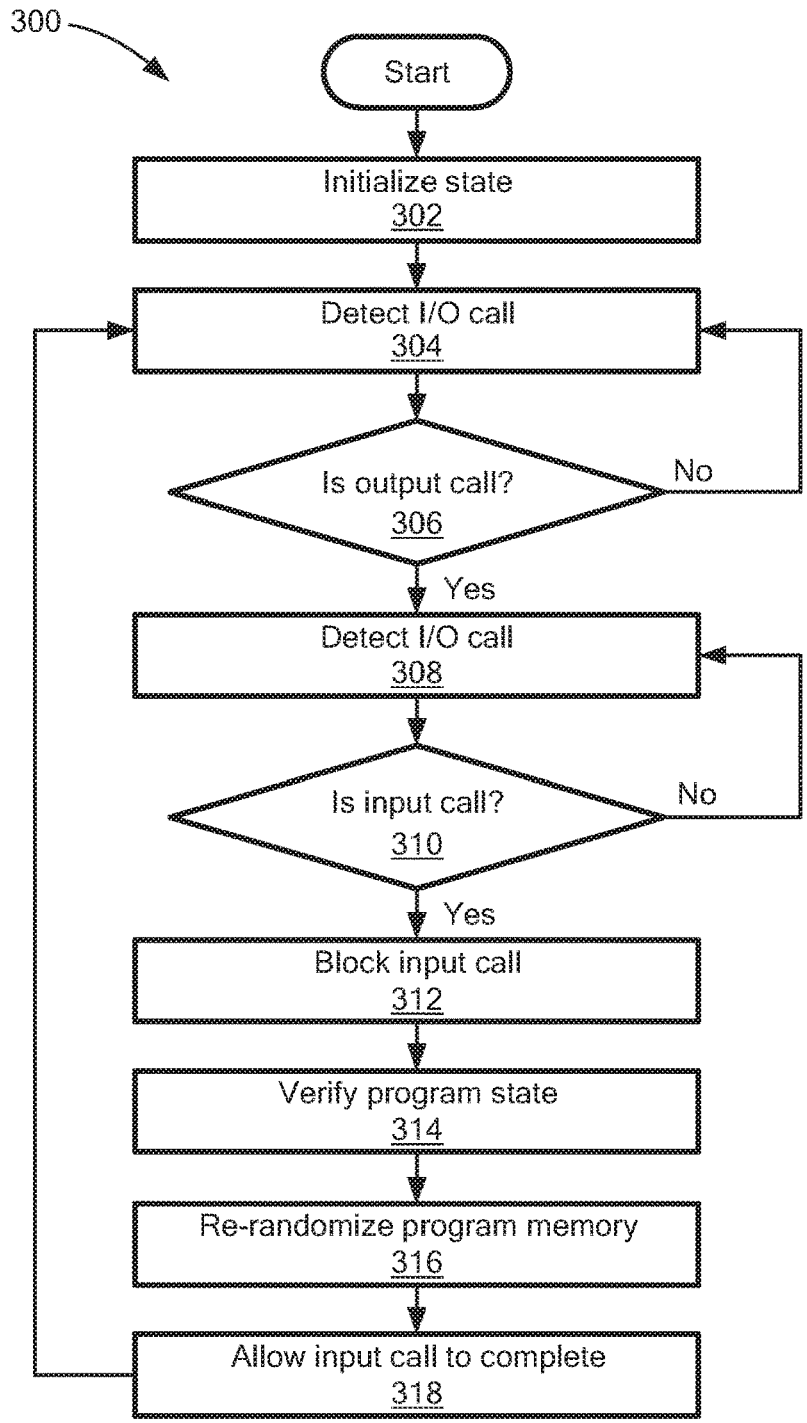
FIG. 3 is a flow diagram of an illustrative process for re-randomizing program memory, according to an embodiment.

Referring to FIG. 3, an illustrative process 300 may be used to re-randomize one or more areas of program memory in response to output-input pairs. In some embodiments, a memory protection controller 108 (FIG. 1) may be configured to perform process 300.

The process 300 may begin at block 302 by initializing state of the controller 108 and/or sub-components 110-114. In one embodiment, this may include initializing a state machine or other data structure used track output-input pairs. In some embodiments, block 302 is performed when the program loads. For example, as discussed above in conjunction with FIG. 1, a software wrapper 116 may use a hooking call to detect a program entry point.

At block 304, the process 300 may detect an I/O call. In some embodiments, block 304 includes using a hooking call to detect an I/O call. In certain embodiments, a software wrapper (such as software wrapper 116 in FIG. 1) may be used to detect the I/O call. If the detected I/O call is an output call (block 306), then processing may proceed to block 308. Otherwise process 300 may loop (blocks 304, 306) until an output call is detected. Once an output call is detected, the process 300 may loop (blocks 308, 310) until an input call is detected. Thus, the process 300 may detect an output-input pair.

After an output-input pair is detected, process 300 may temporarily block (or "intercept") the input call (block 312) and perform various processing to mitigate a possible memory disclosure attack before allowing the input call to complete.

In the embodiment shown, the process 300 verifies program state (block 314) and re-randomizes one or more areas of program memory (block 316) before allowing the input call to be completed. Verifying program state (block 314) may include checking stack cookies, heap integrity data, and/or an encrypted FLT to verify that actual random values in memory match expected values. If a mismatch is found, the program may be terminated (or "aborted") and a possible attack may be logged. In some embodiments, the possible attack may be logged using a system logger provided by the OS. In some embodiments, re-randomizing program memory (block 316) may include re-randomizing stack cookies using techniques described below in conjunction with FIGS. 4A and 4B. In certain embodiments, re-randomizing program memory (block 316) may include re-randomizing heap integrity data using techniques described below in conjunction with FIGS. 5A and 5B. In particular embodiments, re-randomizing program memory (block 316) may include re-randomizing an encrypted FLT using techniques described below in conjunction with FIGS. 6A-6C.

After the possible memory disclosure attack is mitigated, the process 300 may allow the input call to complete (block 318) and the process may repeat from block 304, as shown. In some embodiments, allowing an input call to complete (block 318) may include returning control to the program.

Figure 4A:
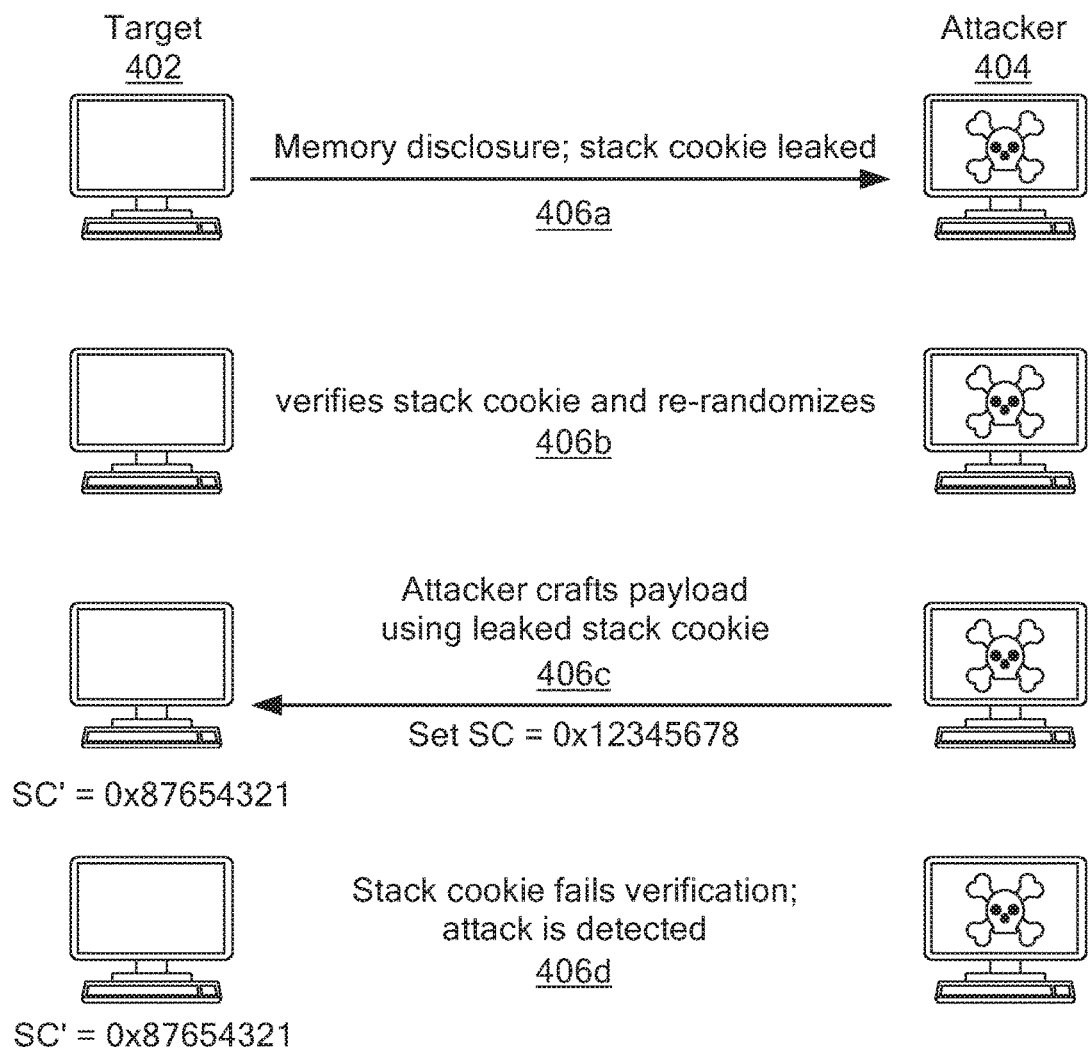
FIG. 4A is an interaction diagram showing how timely randomized memory protection can prevent a stack-based memory corruption attack, according to an embodiment.

FIG. 4A illustrates using timely memory re-randomization to prevent an attacker 404 from completing a stack-based memory corruption attack on a target computer system 402, according to some embodiments. The target computer system (or "target") 402 may be the same as or similar to computer system 100 of FIG. 1.

At step 406a, the attacker 404 may use a stack overflow or other vulnerability to leak the value of a stack cookie associated with a program running on the target 402. Once the secret value of the stack cookie is compromised, the attacker 404 may attempt to use it to overflow a program buffer without being detected. In particular, the attacker 404 may generate a payload to manipulate the program stack without invalidating the stack cookie (e.g., by overwriting the leaked stack cookie with the same value or by updating the stack cookie and a corresponding secret key).

At step 406b, before the attacker's payload is processed as input to the program, the target 402 can re-randomize stack cookies to thwart the attack. Illustrative techniques for re-randomize stack cookies are described below in conjunction with FIG. 4B.

At step 406c, by the time the attacker's payload is processed as input, the leaked stack cookie information will be rendered obsolete. As a result, at step 406d, the target is computer system 402 can detect a stack cookie mismatch and take appropriate action (e.g., logging an attack and/or aborting the program). It will be appreciated that without the benefit of the timely memory randomization techniques disclosed here, the attacker's payload could have included the correct stack cookie, allowing the attacker 404 to successfully corrupt the program stack.

Figure 4B:
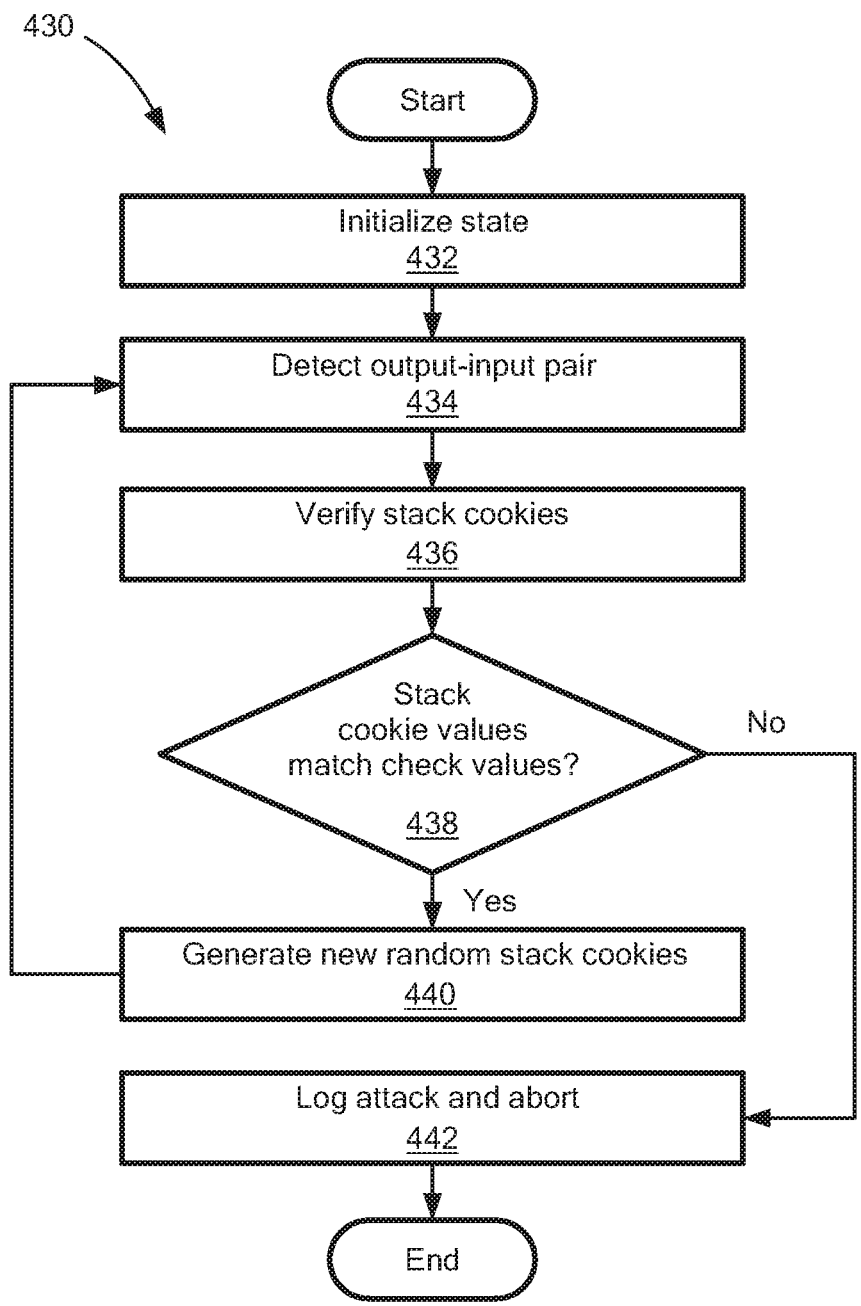
FIG. 4B is a flow diagram of an illustrative process for re-randomizing stack cookies, according to an embodiment.

FIG. 4B shows a process 430 for preventing a stack-based memory corruption attack on a program, according to some embodiments. In some embodiments, a memory protection controller 108 (FIG. 1) may be configured to perform process 430. In certain embodiments, stack component 110 may be configured to perform at least some of process 430.

In certain embodiments, the process 430 may be implemented within a computer system running a WINDOWS operating system. In such systems, a master stack cookie may be computed for each module upon module load. This module-wide cookie can be used to dynamically generate individual, per-function stack cookies prior to each function call. Specifically, the master cookie may be XOR'ed with the offset address of the current stack frame to generate a stack cookie. The stack cookie may be placed on the stack before the function's return address. Before the function returns, the stack cookie may be verified using the master stack cookie to detect a possible attack.

Referring to FIG. 4B, process 430 may begin at block 432 by initializing state associated with the controller 108 and/or sub-components 110-114. In some embodiments, at program load, process 430 intercepts the program entry point and creates a list of all the modules used by the program. In certain embodiments, for each module, the memory address of its master cookie is determined and stored (e.g., using an array or other data structure).

At block 434, an output-input pair may be detected. Before the input call is allowed to proceed, existing stack cookies may be verified (block 436). If, at block 438, any of the existing stack cookies do not match their expected values, an attack may be logged and the program aborted (block 442). Otherwise, new random stack cookies may be generated (block 440), the input call may be allowed to complete, and process 430 may repeat from block 434.

In some embodiments, verifying existing stack cookies (blocks 436, 438) may include obtaining a current stack trace and, for each stack frame, comparing the actual stack cookie matches an exected value. In certain embodiments, the expected value in determined by XOR'ing the stack frame offset address with the master cookie. In some embodiments, the StackWalk64 WINDOWS API function is used to obtain a stack trace.

In some embodiments, generating new random stack cookies (block 440) may include: generating a new random master cookie; generating a new random stack cookie for each stack frame in the current stack trace using the new master cookie and the stack frame offset address; and storing the new master cookie and the new stack cookies in memory. In some embodiments, each new stack cookie is stored within the stack before corresponding function return address.

Figure 5A:
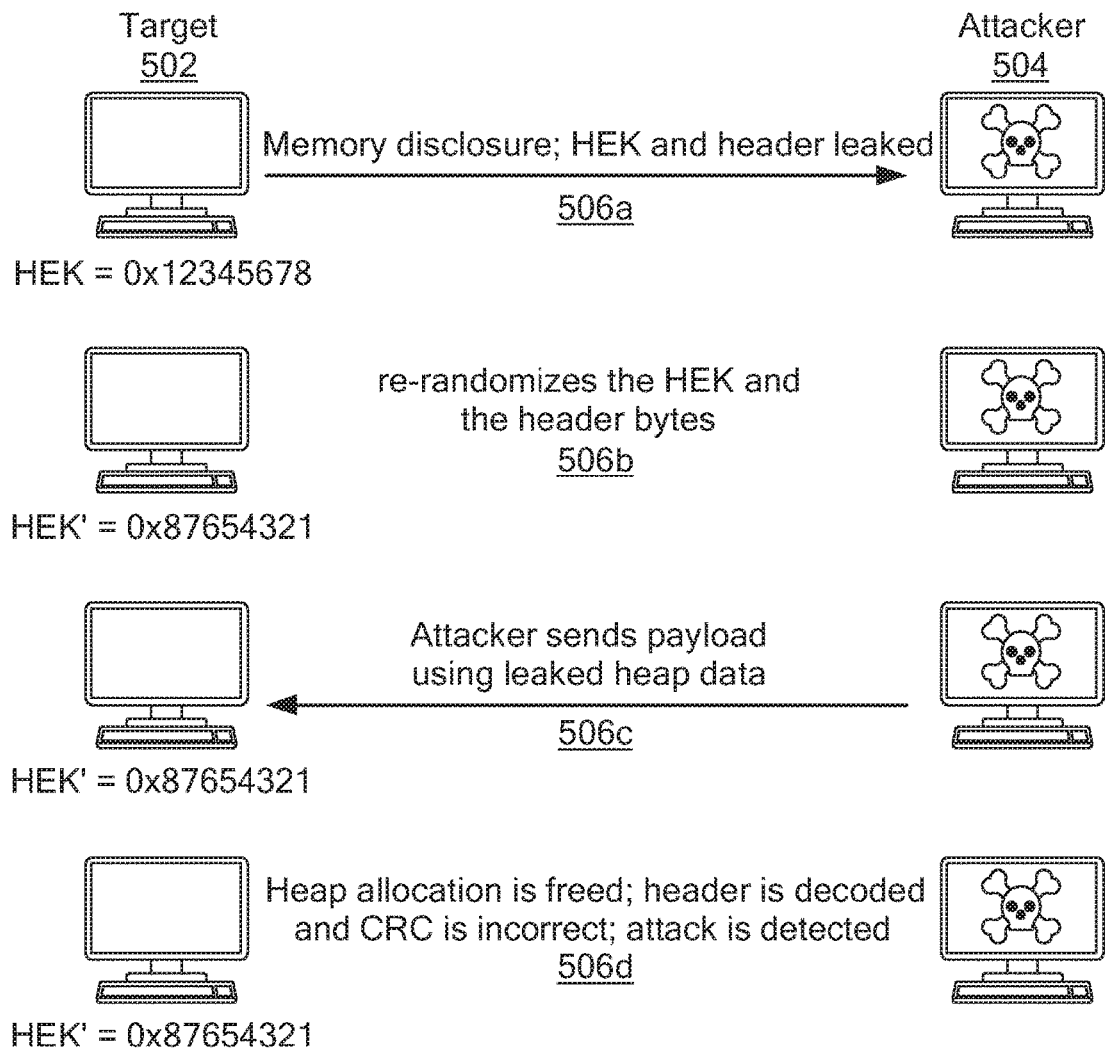
FIG. 5A is an interaction diagram showing how timely randomized memory protection can prevent a heap-based memory corruption attack, according to an embodiment.

FIG. 5A illustrates using timely memory re-randomization to prevent an attacker 504 from completing a heap-based memory corruption attack on a target computer system 502, according to some embodiments. The target computer system (or "target") 502 may be the same as or similar to computer system 100 of FIG. 1.

At step 506a, the attacker 504 may use a program vulnerability to leak heap integrity data (e.g., a secret key and/or a heap cookie) associated with a program running on the target 502. Once the header integrity data is compromised, the attacker 504 may attempt to use it to corrupt the program's heap without being detected. In particular, the attacker 504 may generate a payload having a heap allocation header including valid heap integrity data (e.g., encrypted using the correct secret key and having a valid error-detecting code).

At step 506b, before the attacker's payload is processed as input to the program, the target 502 can re-randomize the program's header integrity data to thwart the attack. Techniques for re-randomizing heap header integrity data are discussed below in conjunction with FIG. 5B.

At step 506c, by the time the attacker's payload is processed, the leaked header integrity data will be rendered obsolete. As a result, at step 506d, the target computer system 502 can detect the heap corruption and take appropriate action (e.g., logging an attack and/or aborting the program). For example, the target 502 may detect an invalid error-detecting code in the heap allocation header.

Figure 5B:
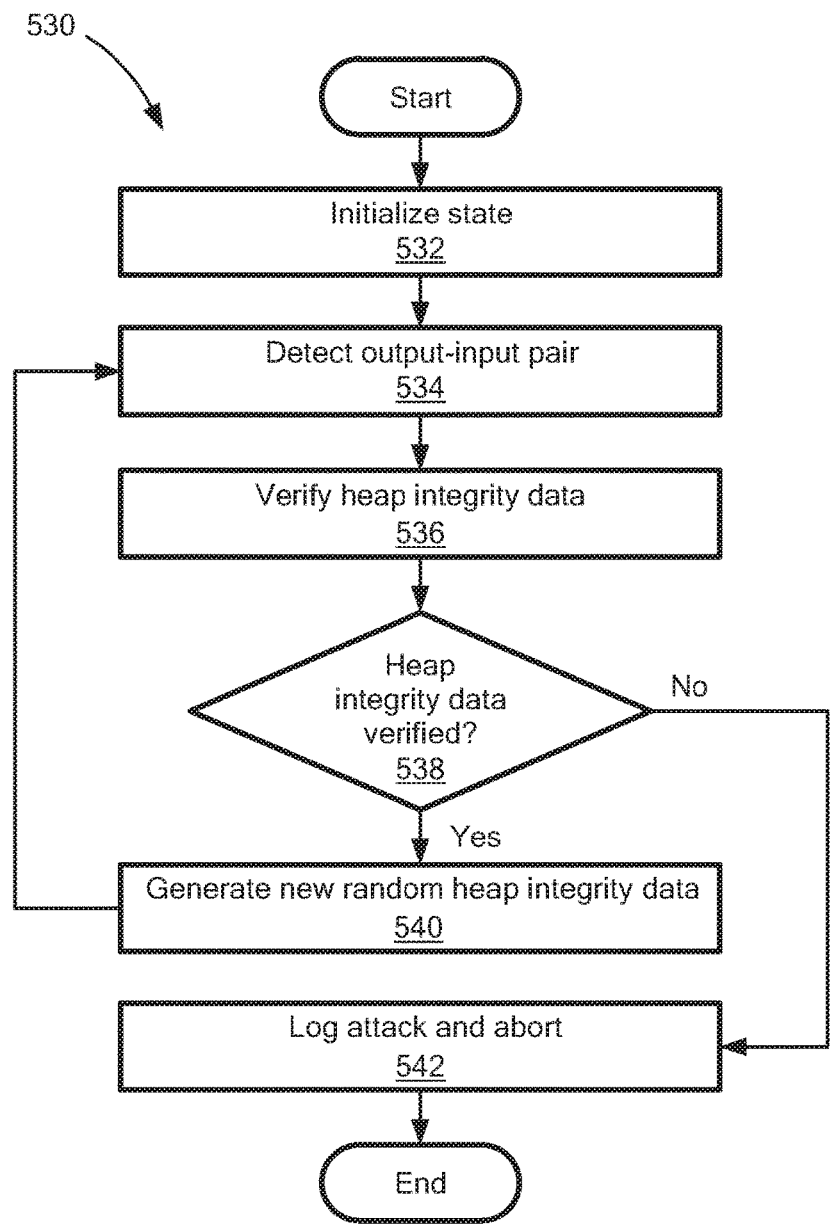
FIG. 5B is a flow diagram of an illustrative process for re-randomizing heap metadata, according to an embodiment.

FIG. 5B shows a process 530 for preventing a heap-based memory corruption attack on a program, according to some embodiments. In some embodiments, a memory protection controller 108 (FIG. 1) may be configured to perform process 530. In certain embodiments, heap component 112 may be configured to perform at least some of process 530.

The process 530 may begin at block 532 by initializing state of the controller 108 and/or sub-components 110-114. At block 534, an output-input pair may be detected. Before the input call is allowed to proceed, existing heap integrity data may be verified (block 536). If any existing heap integrity data cannot be verified, an attack may be logged and the program aborted (block 542). Otherwise, new random heap integrity data may be generated (block 538), the input call may be allowed to proceed (e.g., control may be returned to the program), and process 540 may repeat from block 534.

In some embodiments, verifying existing heap integrity data (block 536) includes attempting to decode a heap allocation header using a secret key. The secret key may be a module-wide secret value (e.g., the same module-wide secret value used for stack cookies). In certain embodiments, verifying existing heap integrity data includes calculating an expected error-detecting code (e.g., a CRC) value over the heap allocation header and comparing the expected value with the actual value stored in the header. In some embodiments, verifying existing heap integrity data may include obtaining handles for each of the program's heap allocations and, for each heap allocation, decrypting header data and/or performing the error-detecting code check.

In certain embodiments, generating new random heap integrity data (block 538) may include generating a new secret key (e.g., a random value), storing the new random secret key in memory, and encrypting heap allocation headers using the new secret key. In some embodiments, generating new random heap integrity data may include generating new random heap cookies. In particular embodiments, generating new random heap integrity data may include calculating error-detecting codes. In certain embodiments, verifying existing heap integrity data may include obtaining handles for each of the program's heap allocations and, for each heap allocation, generating a new random heap cookie and/or calculating an error-detecting code.

Figure 6A:
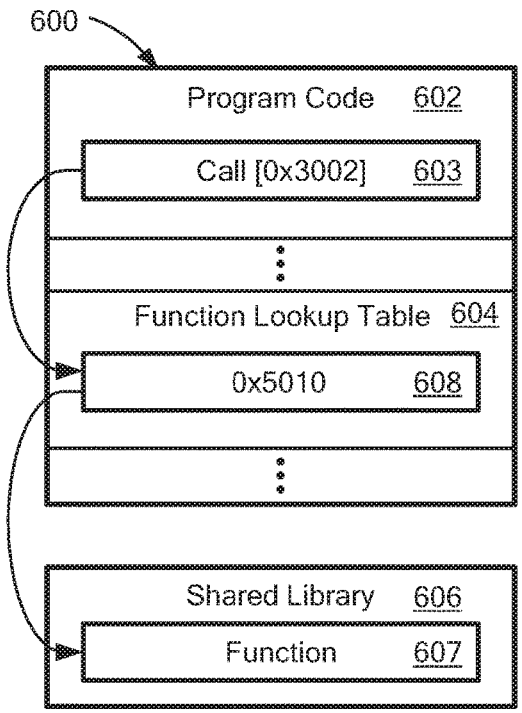
FIGS. 6A and 6B are diagrams of program address spaces having function lookup tables (FLTs)
Figure 6B:
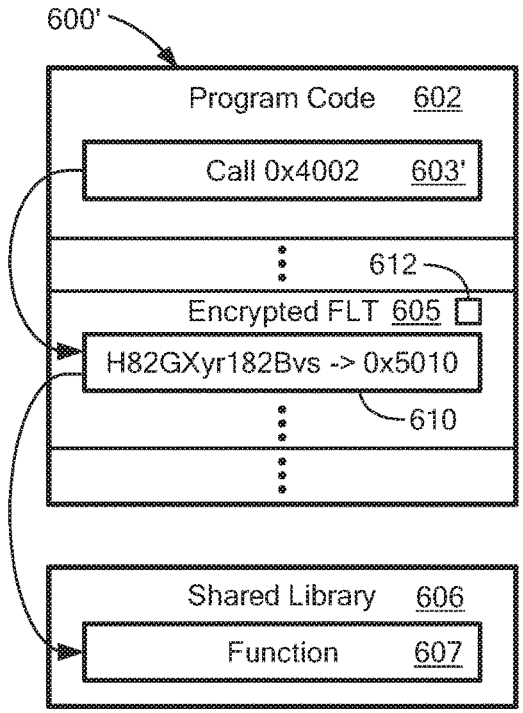
Figure 6C:
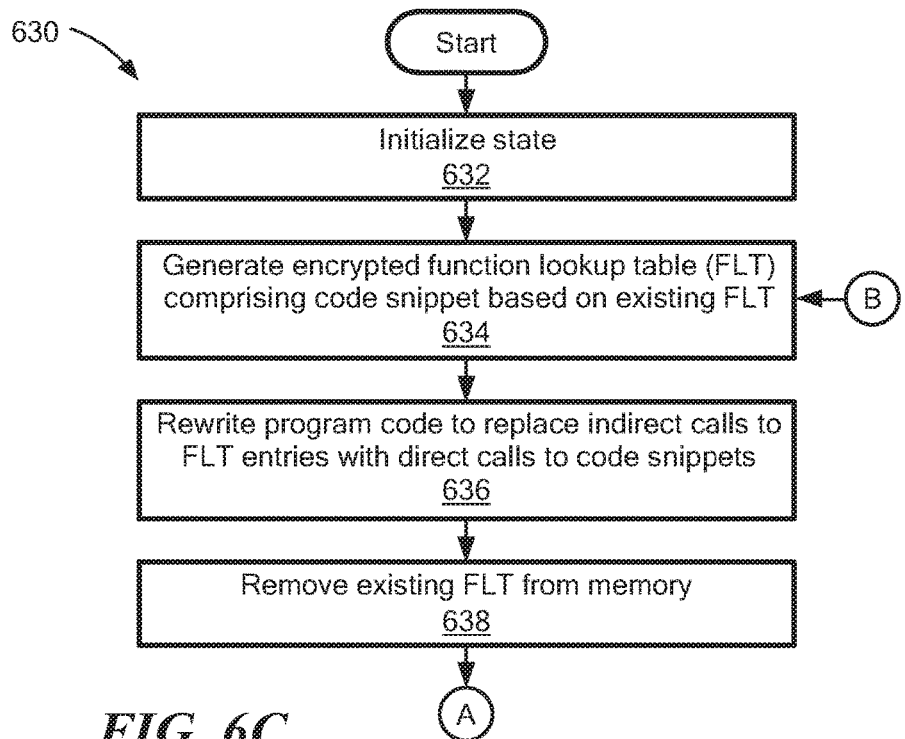
FIG. 6C is a flow diagram of an illustrative process for re-randomizing a function lookup table (FLT), according to an embodiment.
Figure 6C:
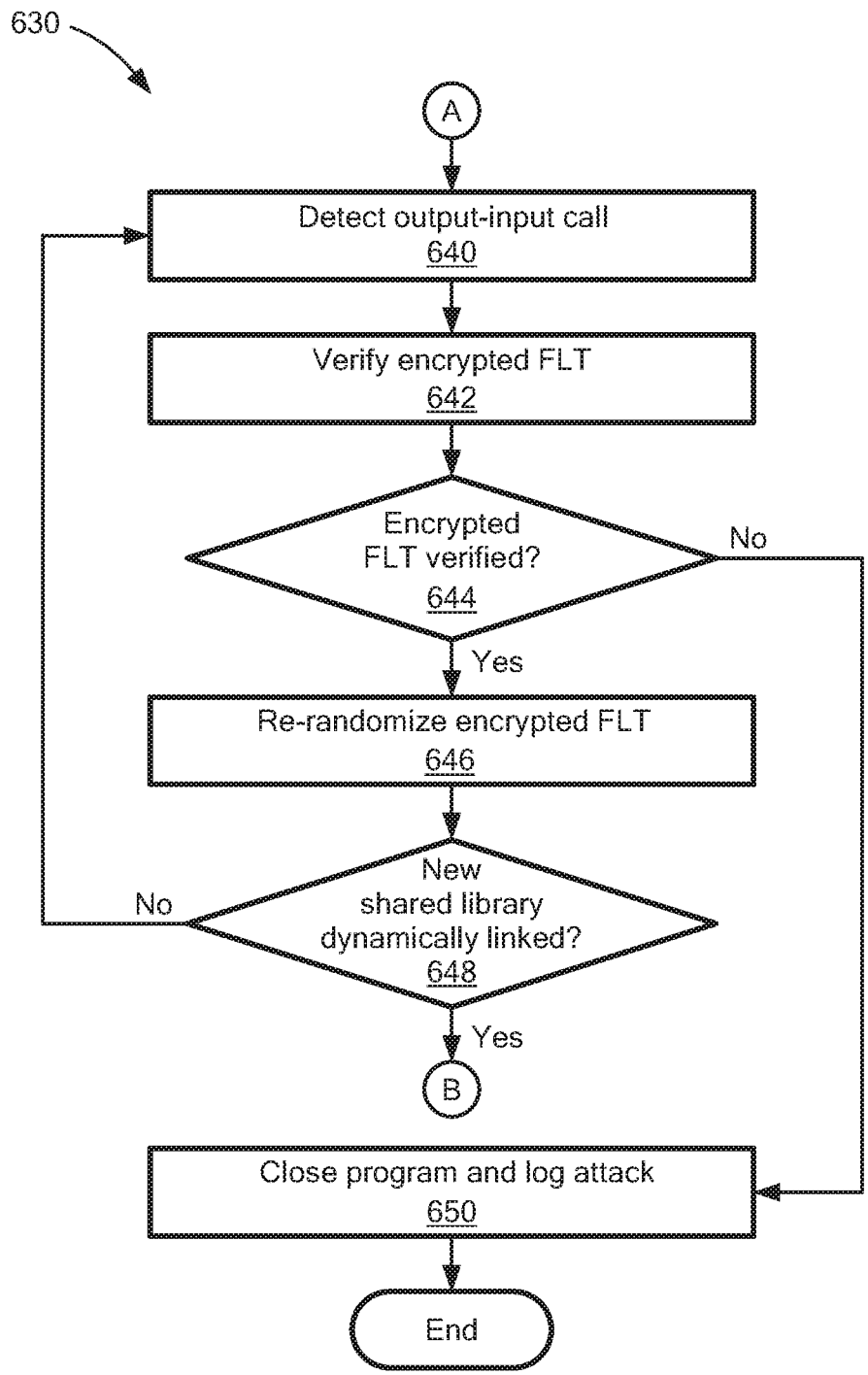

FIGS. 6A-6C illustrate structures and techniques for encrypting and re-randomization of function lookup tables (FLTs), according to some embodiments. The structures and techniques described herein can prevent FLT hooking attacks and mitigate the impact of FLT disclosures.

Referring to FIG. 6A, an illustrative program address space 600, which may be the same as or similar to address space 106 of FIG. 1, includes program code 602 and an FLT 604. The program address space 600 may also include other memory regions (e.g., stack and heap) not shown in this example.

Program code 602 may access external data and functions within shared libraries 606 via the FLT 604. For example, the FLT 604 may include one or more so-called "function entries" 608, each of which may store the address of an external function 607 (i.e., a function included within a shared library 606). In FIGS. 6A and 6B, external function 607 is assumed to be at address "0x5010." To call the external function 607, the program may include an indirect call instruction 603 that references the address (e.g., "0x3002" as shown the figure) of a function lookup table entry 608.

For clarity, only one shared library 606, one external function 607, and one FLT function entry 608 are shown in FIG. 6A, however it should be understood that a program be linked to many shared libraries each having many functions.

An OS 104 (FIG. 1) may populate the FLT 604 with function entries 608 during program startup. In some embodiments, function entries may be added to the FLT 604 after to program startup when shared libraries are dynamically linked to the program.

FIG. 6B shows an illustrative program address space 600' that may be the same as or similar to address space 600 of FIG. 6A, but with the FLT 604 replaced by a so-called "encrypted function lookup table" or "encrypted FLT" 605.

During program startup, the existing FLT 604—along with the plaintext function addresses stored therein—may be removed from the program address space 600' and the encrypted FLT 605 may be generated and added to the address space 600. In some embodiments, the encrypted FLT 605 is generated as a code region (or "code section") within the program address space 600'. The encrypted FLT 605 may include one or more "code snippets" 610, each of which may correspond to a particular external function 607.

A code snippet 610 is a sequence of computer instructions that includes the address of an external function 607, but in encrypted form. In FIG. 6B, the encrypted address for external function 607 is denoted "H82GXyr182Bvs." In some embodiments, a code snippet 610 includes instructions to acquire a secret key 612, to decrypt the encrypted address using the secret key 612, and to jump to the decrypted address ("0x5010") of the external function 607. The secret key 612 may be stored at any suitable memory location.

After the code snippets 610 are added to program memory 600', the program code 602 may be rewritten at replace indirect calls to FLT function entries 608 with direct calls to code snippets 610. For example, as shown in FIGS. 6A and 6B, the indirect call 603 to address 0x3002 may be replaced with a direct call 603' to address 0x4002, which may correspond to the base address of code snippet 610.

In some embodiments, an XOR-based encryption scheme is used within the code snippets 610. In particular, when the code snippet 610 is generated, the plaintext address of the external function 607 may be XOR'd with the secret key 612 to generate an encrypted address. In addition, the generated code snippet 610 may include instructions recover the plaintext address by XOR'ing the encrypted address with the secret key 612. In certain embodiments, the plaintext address is XOR'd with the secret key 612 and also with a value unique to the code snippet 610 in order to make the encryption pad unique for each code snippet 610. In one embodiment, the plaintext address is XOR'd with the secret key and with a memory offset unique to the code snippet 610.

In certain embodiments, so-called "dummy" instructions (i.e., instructions that are not executable or that are not intended to be executed by the program) may be added to the encrypted FLT 605, interleaved among the code snippets 610. In some embodiments, dummy instructions may include fake addresses that make statistical cryptanalysis techniques more difficult.

In some embodiments, a random number of null bytes may be added between code snippets 610 in order to terminate buffer overrun leakages and to make the layout of the generated code region 605 less predictable.

In some embodiments, the secret key 612 and the encrypted FLT 605 may be re-randomized during the program's lifetime (e.g., at every output-input call pair). In various embodiments, the location of each code snippet 610 within the encrypted FLT 605 may be changed at every output-input call pair and the program call instructions 603' may be updated accordingly.

It is appreciated that even a complete disclosure of encrypted FLT 605 is not useful for an attacker since the addresses included therein are encrypted. Moreover, the attacker cannot use a code snippet to invoke a shared library function because the location of each function's entry in the encrypted FLT changes at every opportunity at which the attacker may send a malicious payload.

In some embodiments, the aforementioned processing may be performed by a memory protection controller (e.g., controller 108 of FIG. 1) using a software wrapper 116.

FIG. 6C shows a process 630 for encrypting and re-randomizing a program's FLT, according to some embodiments. In certain embodiments, a memory protection controller 108 (FIG. 1) may be configured to perform process 630. In particular embodiments, FLT component 114 may be configured to perform at least some of process 630.

The process 630 may begin at block 632 by initializing state of the controller 108 and/or sub-components 110-114 (FIG. 1).

At block 634, an encrypted FLT may be generated. The encrypted FLT may be generated as a new code section added to the program's address space. In some embodiments, the process 630 generates a code snippet for each function entry in the existing FLT. In certain embodiments, a code snippet includes instructions to obtain a secret key, to decrypt an encrypted address using the secret key, and to jump to the decrypted address. In certain embodiments, the process 630 adds dummy instruction sequences to the encrypted FLT. In some embodiments, the process 630 adds a random number of null bytes between code snippets. In certain embodiments, the process 630 generates an encrypted FLT that is the same as or similar to encrypted FLT 605 described above in conjunction with FIG. 6B.

At block 636, the process 630 may rewrite program code to replace indirect calls to FLT function entries with direct calls to code snippets within the encrypted FLT. At block 638, the existing FLT may be removed from the program address space.

The processing of blocks 632-638 may be performed during program startup and/or after a shared library is dynamically link into the program. In some embodiments, the process 630 may include using a software wrapper to detect when the program loads and/or when a shared library is dynamically linked.

At block 640, an output-input pair may be detected. Before the input call is allowed to complete, the encrypted FLT may be verified (blocks 642). If, at block 644, the existing encrypted FLT cannot be verified, an attack may be logged and the program aborted (block 650). Otherwise, the encrypted FLT may be re-randomized (block 646) and the input call may be allowed to proceed.

In some embodiments, verifying the encrypted FLT (block 642) may include attempting to decrypt the encrypted address within each code snippet and verifying that the decrypted values are valid memory locations.

In certain embodiments, re-randomizing the encrypted FLT (block 646) may include generating a new secret key and updating each of the code snippets accordingly. In some embodiments, updating a code snippet may include decrypting the encrypted address using the old secret key to recover the plaintext address and then re-encrypting the plaintext address using the new secret key. The new secret key and updated code snippets may be stored in memory. In various embodiments, re-randomizing the encrypted FLT may include changing the location of each code snippet within the encrypted FLT and updating the program call instructions accordingly.

In some embodiments, the process 630 can detect shared libraries that are dynamically linked to the program after startup. If a new shared library is detected (block 648), then a new encrypted FLT may be generated and the program code updated, as described above in conjunction with blocks 634-636.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. In a system executing a program, a method of protecting the program against information leakage attacks, the method comprising:
   detecting at runtime one or more input/output calls associated with the program; and
   re-randomizing memory associated with the program in response to the one or more input/output calls, wherein re-randomizing the memory comprises generating random stack cookies.

2. The method of claim 1 wherein generating the random stack cookies comprises:
   generating a random master cookie;
   storing the master cookie in the memory;
   obtaining a stack trace for the program, the stack trace including information about one or more stack frames;
   for each of the stack frames, generating a random stack cookie using the master stack cookie; and
   for each of the stack frames, storing the stack cookie in the memory.

3. The method of claim 2 further comprising:
   verifying the random stack cookie for each of the stack frames using the master stack cookie.

4. The method of claim 2 wherein the stack trace includes a memory address for each of the stack frames, and wherein generating a random stack cookie for each of the stack frames comprises performing a logical exclusive disjunction operation (XOR) between the master stack cookie and the corresponding memory address.

5. The method of claim 2 wherein the program comprises a plurality of modules, and wherein generating the random master cookie comprises generating a random master cookie for each of the modules.

6. The method of claim 5 further comprising, for each of the modules:
   detecting the module being loaded;
   determining a memory location of a master cookie associated with the module; and
   in response to generating the random master cookie for the module, storing the generated master cookie at the determined memory location.

7. In a system executing a program, a method of protecting the program against information leakage attacks, the method comprising:
   detecting at runtime one or more input/output calls associated with the program; and re-randomizing memory associated with the program in response to the one or more input/output calls, wherein re-randomizing memory associated with the program comprises re-randomizing heap integrity data by:
  generating a random secret key;
  storing the random secret key in the memory;
  determining a memory location for one or more heap allocations stored in the memory;
  for each of the heap allocations, encrypting header information associated with the heap allocation using the secret key; and
  for each of the heap allocations, storing the encrypted header information in the memory.

8. The method of claim 7 further comprising:
verifying the encrypted header information for each of the heap allocations using the secret key.

9. The method of claim 8 further comprising:
verifying a error-detecting code value for each of the heap allocations.

10. The method of claim 7 further comprising, for each of the heap allocations:
  generating a random heap cookie;
  calculating an error-detecting code value using at least the random heap cookie; and
  storing the error-detecting code value in the memory.

11. In a system executing a program, a method of protecting the program against information leakage attacks, the method comprising:
  detecting at runtime one or more input/output calls associated with the program; and
  re-randomizing memory associated with the program in response to the one or more input/output calls, wherein re-randomizing memory associated with the program comprises re-randomizing an encrypted function lookup table (FLT).

12. The method of claim 11 further comprising:
  generating the encrypted FLT based on an existing FLT associated with the program, the encrypted FLT having a plurality of code snippets; and
  rewriting program code to replace indirect calls to the existing FLT with direct calls to the code snippets.

13. The method of claim 12 wherein each of the code snippets includes instructions to decrypt an encrypted address associated with the code snippet using a secret key and to call a function at the decrypted address associated with the code snippet, and wherein re-randomizing the encrypted FLT comprises:
  generating a new secret key;
  storing the new secret key in memory; and
  updating each of the code snippets to use the new secret key.

14. The method of claim 12 wherein re-randomizing the encrypted FLT comprises:
  changing a memory location of one or more of the code snippets with the encrypted FLT; and
  rewriting the program code to call the one or more code snippets at the corresponding changed memory location.

* * * * *